(12) United States Patent
Coulson

(10) Patent No.: US 6,582,197 B2
(45) Date of Patent: Jun. 24, 2003

(54) METHOD OF INVESTMENT CASTING WITH CASTING IDENTIFICATION

(76) Inventor: Simon E. Coulson, 3 Frobisher Close, Teignmouth, Devon, TQ14 9NE (GB)

(*) Notice: Subject to any disclaimer, the term of this patent is extended or adjusted under 35 U.S.C. 154(b) by 25 days.

(21) Appl. No.: 09/790,993

(22) Filed: Feb. 22, 2001

(65) Prior Publication Data

US 2002/0114701 A1 Aug. 22, 2002

(51) Int. Cl.$^7$ .................................................. F01D 5/28
(52) U.S. Cl. ............................ 416/241 R; 164/122.1; 164/34
(58) Field of Search ................. 416/241 R, 61, 416/146 R, 24 R; 164/122.1, 122.2, 229, 34, 35, 45, 516

(56) References Cited

U.S. PATENT DOCUMENTS

| | | | |
|---|---|---|---|
| 4,137,962 A | * 2/1979 | Pol | 101/18 |
| 4,318,683 A | 3/1982 | Fishbaugh et al. | 425/429 |
| 4,342,549 A | * 8/1982 | Lemelson | 249/102 |
| 4,384,702 A | * 5/1983 | Boskovic | 249/103 |
| 4,409,718 A | 10/1983 | Pryor | 29/407 |
| 4,620,353 A | 11/1986 | Pryor | 29/407 |
| 4,644,151 A | 2/1987 | Juvinall | 250/223 |
| 4,708,314 A | 11/1987 | Kühling | 249/103 |
| 4,756,814 A | 7/1988 | Van Voren et al. | 204/294 |
| 4,900,637 A | 2/1990 | Darovec | 428/577 |
| 5,057,000 A | 10/1991 | Mangone, Jr. | 425/190 |
| 5,125,448 A | 6/1992 | Jensen | 164/155 |
| 5,316,707 A | 5/1994 | Stranciu et al. | 264/40.1 |
| 5,318,418 A | 6/1994 | Netto | 425/150 |
| 5,329,985 A | 7/1994 | Weimann | 164/229 |
| 5,393,967 A | 2/1995 | Rice et al. | 235/454 |
| 5,465,780 A | * 11/1995 | Muntner et al. | 164/369 |
| 5,498,307 A | 3/1996 | Stevenson | 156/277 |
| 5,677,522 A | 10/1997 | Rice et al | 235/454 |
| 5,804,342 A | 9/1998 | Paz-Pujalt et al. | 430/19 |
| 5,814,252 A | 9/1998 | Gouldson et al. | 264/40.5 |
| 5,853,606 A | 12/1998 | Boskovic | 249/103 |
| 5,894,005 A | 4/1999 | Steel et al. | 264/40.1 |
| 5,902,512 A | 5/1999 | Streit | 249/103 |
| 6,052,465 A | 4/2000 | Gotoh et al. | 380/4 |
| 6,251,212 B1 | * 6/2001 | Moh et al. | 156/268 |

FOREIGN PATENT DOCUMENTS

| | | |
|---|---|---|
| CA | 1 102 092 | 6/1981 |
| CH | 683 073 | 1/1994 |
| EP | 363 791 B1 | 12/1992 |
| EP | 564 861 A1 | 10/1993 |
| EP | 670 211 B1 | 9/1995 |
| EP | 681 878 B1 | 11/1995 |
| FR | 2 693 142 | 1/1994 |
| GB | 2 311 948 | 10/1997 |
| JP | 64-53728 | 3/1989 |
| JP | 6-166255 | 6/1994 |
| JP | 7-8506 | 1/1995 |
| WO | WO 89/02831 | 4/1989 |
| WO | WO 92/11102 | 7/1992 |
| WO | WO 00/27569 | 5/2000 |

* cited by examiner

Primary Examiner—Edward K. Look
Assistant Examiner—Igor Kershteyn (57) ABSTRACT

A method of investment casting a metallic article comprises providing on a fugitive pattern of the article to be cast a relief pattern representing a unique part identification number, investing the pattern in a shell mold, removing the pattern from the shell mold, and introducing molten metallic material into the shell mold to form the solidified cast article having the relief pattern cast-in-place permanently thereon.

21 Claims, 5 Drawing Sheets

METHOD OF INVESTMENT CASTING WITH CASTING IDENTIFICATION

FIELD OF THE INVENTION

The present invention relates to investment casting of metals and alloys in ceramic shell molds fabricated using a fugitive pattern of the article to be cast.

BACKGROUND OF THE INVENTION

In investment casting superalloy gas turbine engine blades and vanes using conventional equiaxed and directional solidification techniques, ceramic investment shell molds with or without a ceramic core therein are filled with molten metal or alloy that is solidified in the mold. The ceramic shell mold is made by the well known lost-wax process where a fugitive (e.g. wax, thermoplastic, etc.) pattern of the blade, vane or other article to be cast is repeatedly dipped in a ceramic slurry, drained of excess slurry and then stuccoed with ceramic particulates, such as ceramic sand (stucco) to build up the shell mold wall thickness to a desired value. The pattern then is selectively removed from the shell mold by thermal or chemical dewaxing techniques, and the green mold is fired to develop adequate mold strength for casting. U.S. Pat. Nos. 5,335,717 and 5,975,188 describe a typical lost-process sequence to make ceramic investment casting shell molds.

After molten metal or alloy is cast in the shell mold and solidified, the investment casting is removed and subjected to one or more post-casting operations including, but not limited to, removing of any ceramic core present, grit blasting to remove remnant ceramic shell mold material, heat treatment to develop casting mechanical properties, hot isostatic pressing to close casting porosity, acid etching to inspect the metal or alloy microstructure, and anodic etching to inspect the surface for defects.

Current practice in investment casting superalloy gas turbine engine blades and vanes using conventional equiaxed and directional solidification techniques is to provide a process routing sheet that includes a part identification number (e.g. serial number) and that is carried through the manufacturing process from the pattern stage through the post-casting operation stage.

SUMMARY OF THE INVENTION

An object of the present invention is to provide for investment casting of a plurality of metallic articles where a relief pattern comprising a three dimensional bar code representing a unique part identification number is provided on each fugitive pattern and is transferred first to each shell mold and then to each metallic article cast in that shell mold such that the bar code is cast-in-place permanently on each investment cast article in a manner that the bar code on the investment cast articles will survive post-casting production operations to provide a readable, unique bar code on each shipped investment cast article.

In an embodiment of the invention, a plastic identification tag bearing the unique bar code is attached to a surface of each fugitive pattern. For example, a polymeric identification tag bearing the unique bar code is wax welded to a surface of each wax pattern of the article to be cast followed by processing pursuant to the lost wax process to build up a ceramic shell mold on the pattern. The plastic identification tag is removed from the shell mold or destroyed with the fugitive pattern is removed from the shell mold. In another embodiment of the invention, a unique three dimensional bar code is engraved, embossed or otherwise formed in a surface of each fugitive pattern. The unique bar code is transferred to the shell mold and then to the cast metallic article and remains permanently thereon through post-casting production operations and on the shipped cast article representative of a unique part identification number thereon.

The invention is advantageous to provide on each investment cast metallic article a permanent unique three dimensional bar code that is readable as a part identification number to permit part tracking and traceability during and after manufacture of each article. The presence of the bar code on the fugitive pattern, shell mold, and investment cast article eliminates the need for machine operators to input into the process routing a part identification number at each work station. Moreover, the presence of the unique bar code on each investment cast article shipped to customers will permit the customer(s) to access the manufacturer's part tracing computer system in which the part identification code is stored in conjunction with associated part dimensional and processing data.

The above objects and advantages of the present invention will become more readily apparent from the following detailed description taken with the following drawings.

DETAILED DESCRIPTION OF THE INVENTION

The invention provides a method for investment casting of a plurality of metallic articles where a three-dimensional bar code representing a unique part identification number is provided on each fugitive pattern and is transferred first to each shell mold and then to each metallic article cast in that shell mold such that the bar code is cast-in-place permanently on each investment cast article in a manner that the bar code on the investment cast articles will survive post-casting production operations to provide a readable, unique three dimensional bar code on each shipped investment cast article.

Although the invention will be described in detail hereafter with respect to investment casting a plurality of superalloy gas turbine engine blades each having a unique part identification cast-in-place thereon, the invention is not so limited and can be practiced to investment cast a series of any other type of metallic articles where each investment cast article includes a cast-in-place three dimensional bar code representative of a part identification number, such as a unique part serial number.

Figure 1:
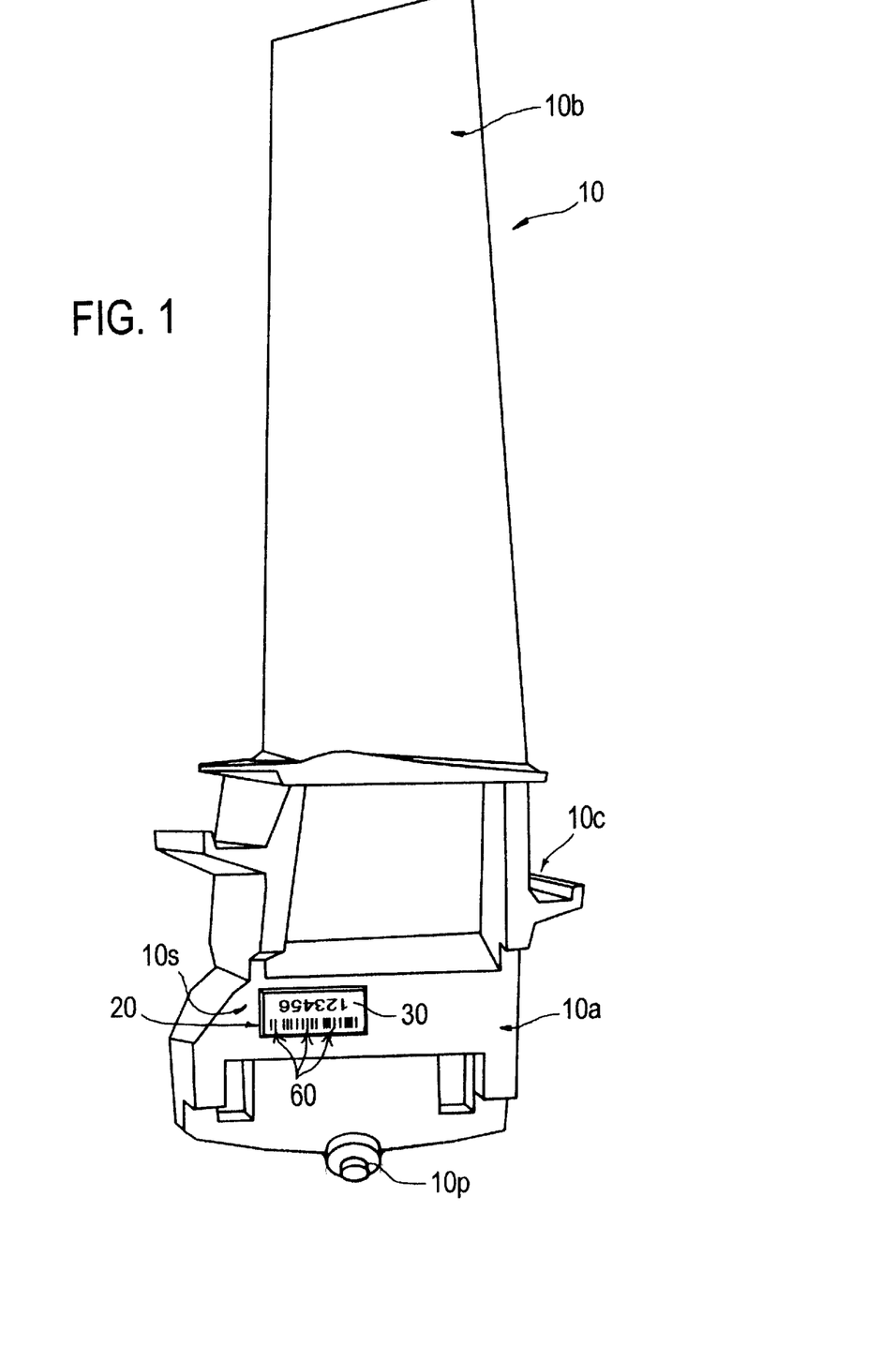
FIG. 1 is a perspective view of a gas turbine blade wax pattern with a plastic identification tag bearing a unique three dimensional bar code shown on a surface of a root portion of the turbine blade.
Figure 1A:
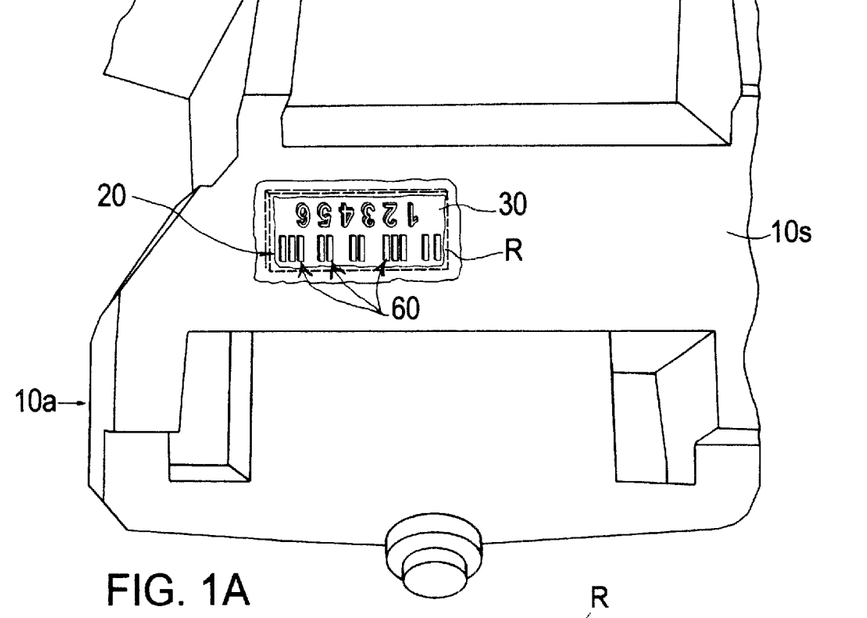
FIG. 1A is an enlarged view of the root portion of the turbine blade pattern showing the plastic identification tag wax welded thereon.
Figure 1B:
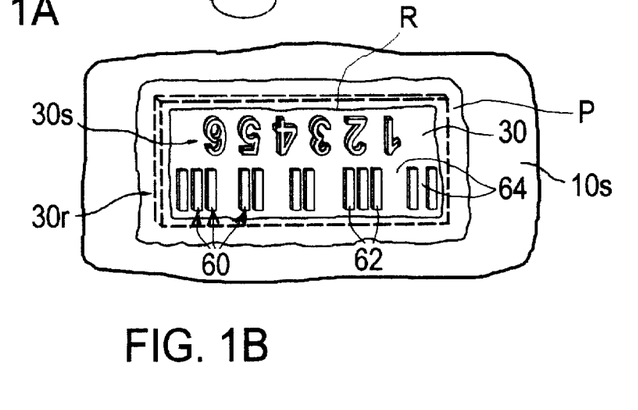
FIG. 1B is a further enlarged view of the root portion of the turbine blade pattern showing the plastic identification tag wax welded thereon.

Referring to FIGS. 1, 1A, and 1B, an illustrative embodiment of the present invention involves use of a fugitive pattern 10 replicating each of a plurality of articles to be investment cast. FIG. 1 illustrates a gas turbine engine blade-shaped fugitive pattern 10 having a root portion 10$a$ and an airfoil portion 10$b$ with an intermediate platform portion 10$c$. The root portion includes projection 10$p$ to be connected to a runner as described below. Each fugitive pattern 10 may comprise a conventional wax pattern commonly used in the investment casting of gas turbine engine blades and formed by injecting molten wax material into a pattern die cavity as is well known. The wax pattern material comprises a conventional investment pattern wax. U.S. Pat. No. 5,983,982 describes a wax pattern material useful to this end, the teachings of which patent are incorporated herein by reference. The fugitive pattern also may comprise a thermoplastic material, such as polyurethane that is reaction injection molded in a pattern die cavity as described in copending application Ser. No. 09/237,435. Other fugitive pattern materials that can be used include, but are not limited to, thermoplastics and rapid prototype plastic materials.

Pursuant to the invention, a three-dimensional bar code 20 representing a unique part identification number is provided on each fugitive pattern 10 and is transferred first to each shell mold and then to each metallic article cast in that shell mold. In FIG. 1A, the bar code 20 is applied as a plastic identification tag 30 bearing a unique three dimensional bar code attached to a surface 10$s$ of the root portion 10$a$ of the fugitive pattern 10. For example, the plastic identification tag 30 is wax welded at its edge periphery to the root surface 10$s$ of each wax turbine blade pattern 10 as illustrated schematically in FIG. 1B. In particular, the tag 30 is placed on the pattern surface 10$s$, and a hot heating iron (not shown) is placed spaced closely to the root surface 10$s$ and manipulated to melt an edge puddle P of wax of the surface 10$s$ about the edge periphery of the tag 30 and that is overlapped and solidified on the edge periphery of the tag to thereby wax weld it on the pattern surface. A narrow rim R of solidified wax thereby remains on top of the periphery of the identification tag 30, FIGS. 1A and 1B. The heating iron can be a conventional soldering iron used in repairing and shaping wax patterns. Alternately, a suitable adhesive (not shown) can be applied to the rear surface 30$r$ of the tag 30 facing the pattern root surface 10$s$, and the tag 30 is positioned on the pattern root surface 10$s$ to be adhered thereon by the adhesive. Also, the tag 30 may be placed on the pattern surface 10$s$, and adhesive (not shown) may be placed on the surface 10$s$ about the edge periphery of the tag 30 and overlapped on the edge periphery of the tag to thereby adhere it on the pattern surface.

The part identification tag 30 can have any suitable shape and dimensions desired, such as the rectangular shape illustrated, with the three dimensional bar code embossed thereon using a stepper motor-driven embossing apparatus available as model C400 embosser from Edward Pryor & Son Limited, Sheffield, England. An illustrative tag 30 can have dimensions of 75 millimeters in length by 55 mm in width with a thickness of 0.8 mm and be made of a low ash, high impact polystyrene available from Bluemay Limited, Devizes, Wiltshire, England.

In FIG. 1A, the three dimensional bar code 20 comprises information (e.g. part identification number) encoded in a relief pattern 60 on the tag surface 30$s$. The relief pattern 60 preferably is of the type known as PosiCode B font and described in Sensis U.S. Pat. Nos. 5,393,967 and 5,677,522 comprising a plurality of raised bars 62 and recesses 64 therebetween. The bar code (e.g. changes in lateral spacing of the bars 62) is read by a commercially available non-contact scanner 100, FIG. 3, developed for this purpose and described in above Sensis U.S. Pat. Nos. 5,393,967 and 5,677,522. Such bar code scanners are available from Traceability Systems, Inc., Pittsburgh, Pa., USA.

The tag 30 is illustrated in FIGS. 1, 1A, 1B as also including an optional alpha-numeric representation of the part identification number for reading by humans. The bar code 20 embossed on tag 30 is considered a positive relief pattern in that the bars 62 rise above the tag surface 30$s$. This positive relief pattern 60 will produce a positive relief pattern on the investment cast turbine blade, FIG. 3.

Figure 1C:
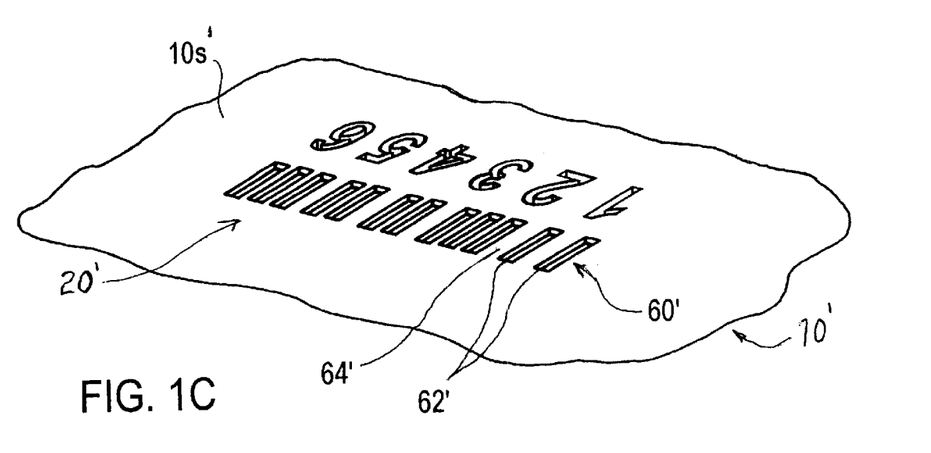
FIG. 1C is an enlarged view of the root portion of the turbine blade showing a three dimensional bar code engraved into the surface of the root portion of the turbine blade pattern.

FIG. 1C illustrates an alternative embodiment of the invention where like features are represented by like reference numerals primed. FIG. 1C differs from FIGS. 1, 1A, 1B in that the identification tag 30 is omitted and the bar code 20' is engraved into the pattern root surface 10$s$' to provide a negative relief pattern 60' in that the bars 62' now comprise recesses provided below pattern root surface 10$s$' and the spaces 64' between bars 62' comprise raised surfaces corresponding to surface 10$s$'. The bar code 20' (e.g. changes in lateral spacing of the recessed bars 64') is read by the non-contact scanner 100, FIG. 3. This negative relief pattern 60' will produce a corresponding negative relief pattern on the investment cast turbine blade. The negative relief pattern 60' can be manually engraved into the pattern root surface 10$s$, or an engraving machine can be used to this end. Each pattern 10' is placed in a suitable fixture (not shown) during engraving to insure that the bar code 20' is at the same location on each pattern 10' for scanning by the above non-contact scanner.

The positive or negative relief image 60 (60') of the bar code 20 (20') provided on the fugitive pattern and thus on the investment cast article must survive the post-casting operations so as to remain in readable form on the investment cast article shipped to customers. For the above PosiCode B font, the dimensions of the bars 62 of the positive or negative relief pattern 60 are chosen to this end. For example only, a typical representative length dimension (vertical dimension in FIG. 1B) of each of the bars 62 can be 5.45 mm (millimeters), a typical representative width dimension (horizontal dimension in FIG. 1B) of each of the bars 62 can be 0.6 mm, and a typical representative depth or height dimension (normal to the plane of the tag 30 in FIG. 1B) of each of the bars 62 can be 0.45 mm. The centers of the bars 62 in positional symbology, such as Posicode B font, are specified to be laid out on a grid of equally spaced parallel lines. The distance between these grid lines is called the G dimension. A typical G dimension can be 0.1814 mm for a Posicode B font with a bar width dimension of 0.6 mm just described. A stepper motor-driven embossing apparatus available as model C400 embosser from Edward Pryor & Son Limited, Sheffield, England, can be used to emboss or form the Posicode bar code on the tag 30 with such width and G dimensions. For purposes of illustration only, for such stepper motor-driven embosser having a step ratio of 0.1814 mm, a typical bar code will comprise 243 steps. The G dimension will depend upon the step ratio of movement of a particular stepper motor-driven embosser in the direction of the G dimension (e.g. 1 step="x" number of mm or inch).

The G dimension is equal to the step ratio of the stepper motor-driven embosser. In lieu of a stepper motor drive system, the embossing apparatus can include a drive system using a lead screw such that the G dimension will depend upon the pitch of the lead screw of the drive system. The invention is not limited to any particular embossing apparatus, however.

The pattern 10 (10') with its unique positive or negative bar code 20 (20') provided thereon typically is assembled with other patterns having their respective unique positive or negative bar code thereon to form a pattern assembly to make a conventional gang or cluster shell mold wherein the pattern assembly comprises a plurality of the patterns 10 (10') each wax welded to a wax runner that is wax welded to a pour cup in conventional manner. Each pattern 10 includes a projection 10p at the root portion 10a for wax welding to a runner to this end in conventional manner. The pattern assembly so formed in this manner is subjected to the well known lost wax process to build up a ceramic shell mold on the pattern assembly. The invention is not limited to practice with patterns arranged to form a gang mold and can be practiced with a single pattern or multiple patterns joined or assembled in any manner.

The pattern assembly comprising multiple patterns 10 (10') is subjected to the well known lost wax process for making a ceramic shell mold. In an illustrative embodiment offered for purposes of illustration only and not limitation, the fugitive pattern assembly is dipped in a ceramic slurry, excess slurry is drained from the pattern assembly, or previously applied shell mold layer, relatively coarse ceramic particulates (e.g. ceramic sand or stucco particles) are applied to the wet ceramic slurry layer and air dried. This sequence is repeated to build up a ceramic shell mold of desired thickness on the pattern assembly.

After each sequence of dipping in ceramic slurry and application of sand or stucco, the slurry coated/stuccoed pattern assembly can be dried in conventional manner by moving the pattern assembly through one or more a drying rooms before repeating the next sequence of dipping in ceramic slurry, draining excess slurry, and applying stucco or sand particulates. Drying of a slurry coated/stuccoed pattern assembly is described in U.S. Pat. No. 4,114,285 and copending patent application Ser. No. 09/690,144 filed Oct. 16, 2000, the teaching of which are incorporated herein with respect to drying of a slurry coated/stuccoed pattern assembly.

In particular, a facecoat ceramic slurry is applied to the pattern first by dipping the pattern in the ceramic facecoat slurry. The composition of the facecoat slurry is selected in dependence on the cast component specifications and metal or alloy to be cast in the shell mold. Excess facecoat slurry is gravity drained from the pattern in a manner and then ceramic sand or stucco particles are applied to the wet ceramic facecoat slurry layer on the pattern assembly typically by gravity rainfall of the ceramic sand or stucco from a hopper (not shown) located above the wet slurry coated pattern assembly.

After the pattern is dipped in the facecoat slurry, drained, sanded and dried, additional primary and secondary back-up layers of slurry and sand or stucco are applied to build up the shell mold to a desired mold wall thickness. A typical shell mold wall thickness is in the range of ⅛ to ½ inch, although other mold wall thicknesses can be built-up as desired for different casting applications. For example, 2nd through 8th back-up layers can be applied onto the 1st facecoat slurry/sand layer. The composition and number of the back-up layers can be varied as desired for a particular shell mold casting application. An outermost cover layer comprising a ceramic slurry without sand or stucco can be applied to the outermost back-up layer to seal the shell mold.

The back-up layers and cover layer typically comprise different ceramic slurries and different sands or stuccoes from that used for the 1st facecoat slurry/sand layer as is well known. For example only, the 1st facecoat ceramic slurry for casting nickel base superalloys can comprise a slurry having a fine alumina flour or powder in an amount of 75 weight % in a water based colloidal silica suspension with other conventional additives such as surfactants, organic green strength additives, and foam reduction additions, such additives being described, for example, in U.S. Pat. No. 5,975,188. The facecoat slurry can be sanded with fine fused alumina sand particles. Primary back-up layers (e.g. the 2nd and 3rd slurry/sand layers) applied proximate the 1st facecoat layer can comprise a relatively low viscosity water based slurry having colloidal silica with fused silica and zircon ceramic flour or powder, and slightly coarser fused silica sand. Additional secondary back-up layers (e.g. the 4th through 8th and the cover layer applied on the primary back-up layers can comprise a higher viscosity water based slurry having colloidal silica with fused silica and zircon ceramic flour or powder, and even coarser fused silica sand or stucco.

After the ceramic mold is invested about the pattern assembly, the pattern assembly is selectively removed by conventional thermal or chemical techniques. For example, a wax pattern assembly can be removed by heating the invested pattern assembly using a conventional flash dewaxing heating step in an oven at a temperature high enough to melt out the wax pattern assembly. Other conventional pattern removal techniques for removing patterns such as microwave heating, chemical dissolution, etc. can be used as well.

The plastic identification tag 30 typically is thermally (melted) destroyed when the fugitive pattern assembly is removed from the shell mold. The melting temperature of the tag material typically is less than the melting temperature of the pattern wax. Thus, when the wax pattern is melted out of the shell mold, the identification tag 30 will melt of the shell mold also. The shell mold typically is inverted when the pattern and tag are melted out to allow the melted pattern material and tag material to drain from the shell mold. The pattern and identification tag can be removed from the shell mold using other techniques for conventional pattern removal techniques.

Figure 2:
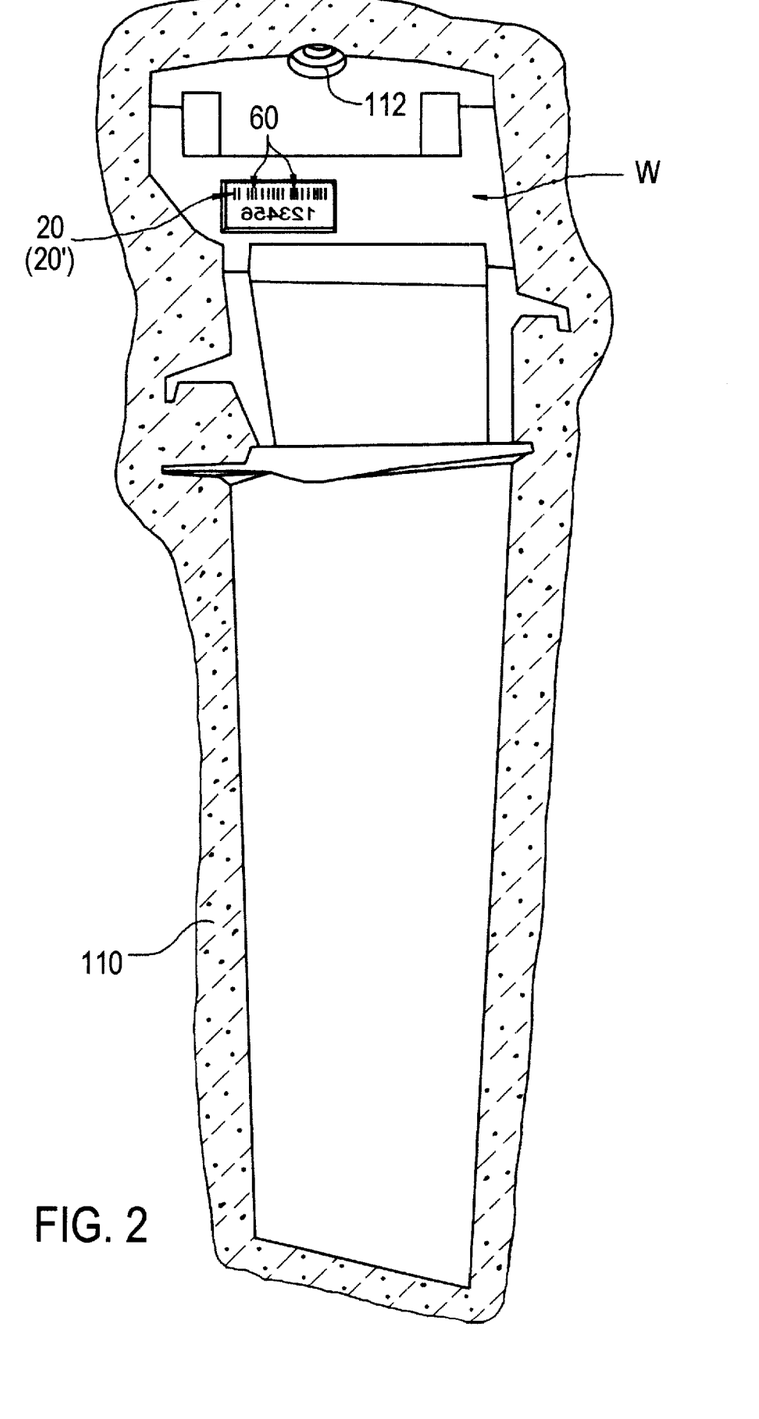
FIG. 2 is a sectional view of a ceramic investment shell mold showing the turbine blade-shaped mold cavity formed therein by the fugitive pattern and the three dimensional bar code formed therein by the plastic identification tag (or engraved or embossed bar code) of the pattern.

Once the pattern assembly is removed, a ceramic gang or cluster shell mold remains having a plurality of individual shell molds connected to a pour cup by runners as is typical in a conventional gang or cluster shell mold. FIG. 2 illustrates one such investment shell mold 110 having a melt inlet passage 112 that communicates to a runner (not shown) from the pour cup. When molten metal or alloy (e.g. molten superalloy) is poured into the pour cup, the alloy flows into each shell mold 110 through the passage 112.

Each shell mold 110 of the gang or cluster mold includes a bar code 20 (20') on the interior mold wall W that corresponds to where the root portion 10a of the pattern 10 was located prior to the pattern removal operation. That is, the unique bar code 20 (20') is transferred to the wall W of each shell mold 110 from the fugitive pattern. The bar code transferred from the fugitive pattern on the mold wall W will be a negative relief pattern when the tag 30 described above having the positive relief pattern 60 was attached to the pattern root surface 10*s*, FIG. 1A. The bar code will be a positive relief pattern when the negative relief pattern 60' was engraved into the pattern root surface 10*s*', FIG. 1C.

The green gang or cluster shell mold typically is heated to an elevated firing temperature to develop adequate mold strength for casting after the pattern assembly is removed. This temperature can be varied as desired depending on the shell mold material used and typically is in the range of 1000 to 1200 degrees C.

Figure 3:
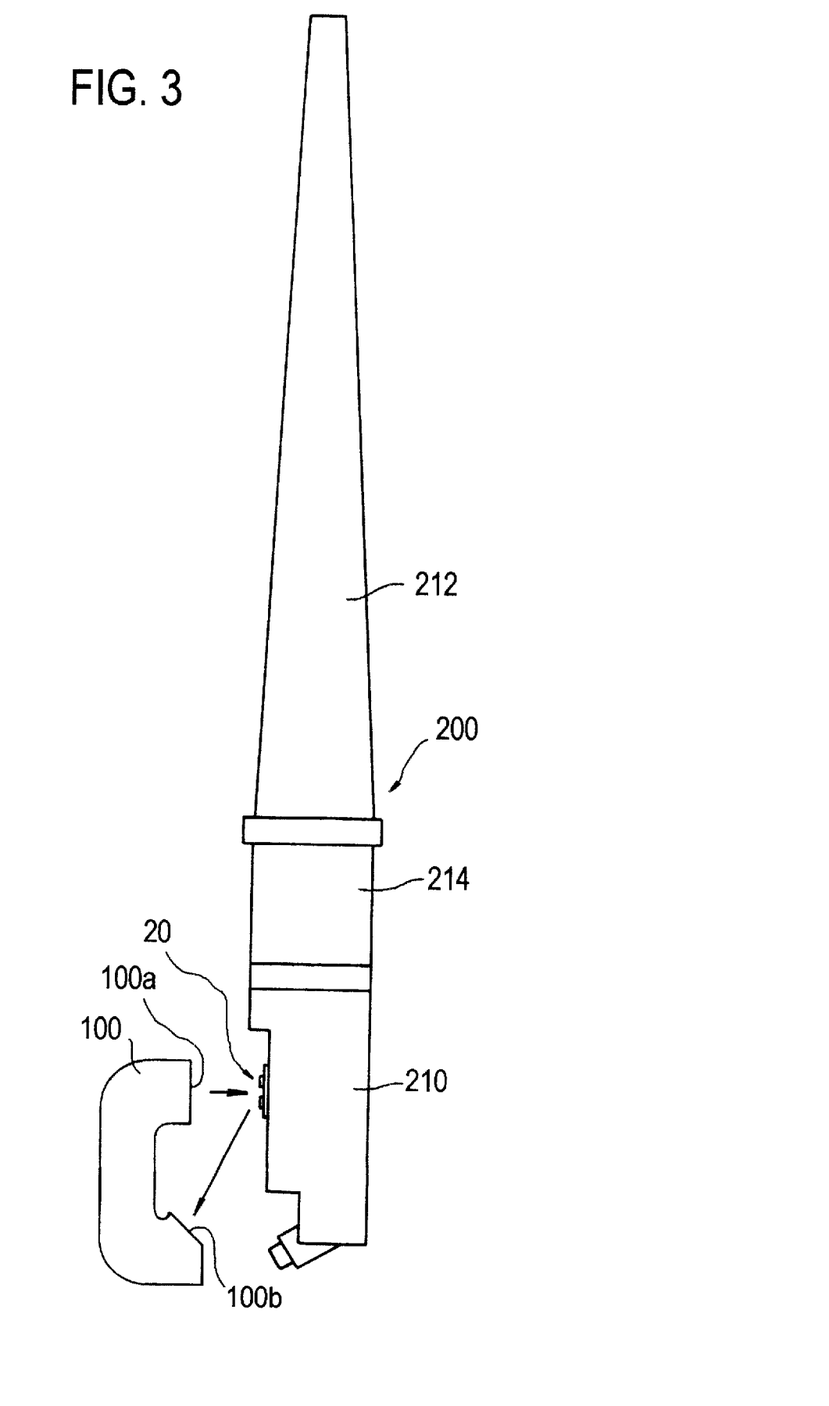
FIG. 3 is a side elevation of the cast turbine engine blade made in the shell mold and having the three dimensional bar code permanently cast-in-place thereon for reading by the non-contact scanner shown schematically.

The unique bar code 20 (20') is transferred to the wall W of each shell mold 110 and then to each cast metallic article 200 cast in each shell mold 110, FIG. 3, for reading by a scanner 100 using light emitted by optical transmitter 100*a* and directed at the bar code and reflected or scattered to an optical receiver 100*b* of the scanner 100 as represented by the arrows. The molten metal or alloy can be cast into the gang or cluster mold followed by solidification using any conventional casting and solidification techniques to produce either equiaxed grain cast articles or directionally solidified cast articles having columnar grain microstructure or a single crystal microstructure. The unique bar code 20 (20') is transferred from each mold wall W to the cast article 200 solidified in that shell mold and remains permanently on each cast article through post-casting production operations and on the shipped cast article representative of a unique part identification number thereon. In FIG. 3, the cast turbine blade 200 includes root region 210 with the unique bar code 20 (20') cast-in-place thereon, an airfoil 212, and platform region 214.

For example, following removal of the cast articles from the gang or cluster mold, the investment cast articles typically are subjected to post-casting operations that include, but are not limited to, removing of any ceramic core present in the cast article, grit blasting to remove remnant ceramic shell mold material, heat treatment to develop casting mechanical properties, hot isostatic pressing to close casting porosity, acid etching to inspect casting microstructure, and anodic etching to inspect casting surface for defects. The cast-in-place bar code on the investment cast articles, such as the turbine blade illustrated in FIG. 3, has been found to survive such post-casting production operations to provide a readable, unique three dimensional bar code on each investment cast article ready to be shipped to a customer.

Practice of the invention is advantageous to provide on each investment cast metallic article a permanent unique three dimensional bar code that is readable as a part identification number to permit part tracking and traceability during and after manufacture of each article. The presence of the bar code on the fugitive pattern, shell mold, and investment cast article eliminates the need for machine operators to input into the process routing a part identification number at each work station. Moreover, the presence of the unique bar code on each investment cast article shipped to customers will permit the customer(s) to access the manufacturer's part tracing computer system in which the part identification code is stored in conjunction with associated part dimensional and processing data.

Although the invention has been described above with respect to certain embodiments, those skilled in the art will appreciate that changes and modifications can be made thereto within the scope of the invention as set forth in the appended claims.

I claim:

1. A method of investment casting a metallic article, comprising providing on a fugitive pattern of the article to be cast a relief pattern representing a unique part identification number, investing the fugitive pattern in a shell mold, removing the fugitive pattern from the shell mold, and introducing molten metallic material into the shell mold to form a solidified cast metallic article having the relief pattern cast-in-place permanently thereon.

2. The method of claim 1 wherein the fugitive pattern is invested in the shell mold by repeatedly dipping the fugitive pattern in ceramic slurry and applying ceramic particulates.

3. The method of claim 1 including subjecting the cast metallic article to one or more post-casting production operations and wherein said relief pattern remains on the cast metallic article for reading by a scanner.

4. The method of claim 3 including subjecting the investment cast article to one or more post-casting steps including removing a ceramic core, grit blasting, heat treatment, hot isostatic pressing, acid etching, and anodic etching.

5. The method of claim 1 wherein said relief pattern is provided on the fugitive pattern by attaching an identification tag bearing the relief pattern to a surface of the fugitive pattern.

6. The method of claim 5 wherein an embossed identification tag bearing the relief pattern is wax welded to a surface of a wax fugitive pattern.

7. The method of claim 6 wherein the identification tag is wax welded on a portion of a wax pattern shaped as an article of a gas turbine engine.

8. The method of claim 1 wherein the relief pattern is provided on the pattern by engraving in a surface of a wax fugitive pattern.

9. The method of claim 1 wherein the relief pattern comprises a bar code comprising a plurality of elongated bars spaced apart.

10. The method of claim 1 wherein the fugitive pattern has a configuration of a gas turbine engine blade and the relief pattern is provided on a root portion of the fugitive pattern.

11. The method of claim 1 wherein the fugitive pattern has a configuration of an article of a gas turbine engine and the relief pattern is provided on the fugitive pattern.

12. An investment cast metallic article having a cast-in-place three dimensional bar code representing a part identification disposed on an exterior surface of said article.

13. The article of claim 12 wherein said bar code comprises a plurality of elongated bars spaced apart.

14. An investment cast superalloy gas turbine engine blade having a cast-in-place three dimensional bar code representing a part identification disposed on an exterior surface of a root portion of the blade.

15. The blade of claim 14 wherein said bar code comprises a plurality of elongated bars spaced apart.

16. A method of investment casting a metallic article, comprising attaching an identification tag on a fugitive pattern of the article to be cast, investing the fugitive pattern in a shell mold such that information on the identification tag is transferred to the shell mold, removing the fugitive pattern and the identification tag from the shell mold, and introducing molten metallic material into the shell mold to form a cast metallic article having the information cast-in-place permanently thereon.

17. The method of claim 16 wherein said tag includes said information in the form of a three dimensional bar code.

18. The method of claim 16 wherein said tag includes said information in the form of an alpha numeric representation.

19. A method of investment casting a metallic article, comprising providing on a fugitive pattern of the article to be cast a three dimensional bar code, investing the fugitive pattern in a mold such that the three dimensional bar code is transferred to the shell mold, removing the fugitive pattern from the shell mold, and introducing molten metallic material into the shell mold to form a cast metallic article having the three dimensional bar code cast-in-place permanently on an exterior surface thereof.

20. The method of claim 19 wherein the fugitive pattern has a configuration of an article of a gas turbine engine and the three dimensional bar code is provided on a tag attached on a surface of the fugitive pattern.

21. The method of claim 19 including subjecting the cast metallic article to one or more post-casting production operations and wherein said three dimensional bar code remains on the article for reading by a scanner.

* * * * *